United States Patent
Bleus et al.

(10) Patent No.: US 10,256,738 B2
(45) Date of Patent: Apr. 9, 2019

(54) DUAL BRIDGE DC/DC POWER CONVERTER

(71) Applicant: Constructions Electroniques + Télécommunications, Wandre (BE)

(72) Inventors: Paul Bleus, Wandre (BE); Thierry Joannes, Flemalle (BE); François Milstein, Liege (BE); Fabrice Frebel, Wandre (BE)

(73) Assignee: Constructions Electroniques + Télécommunications, Wandre (BE)

( * ) Notice: Subject to any disclaimer, the term of this patent is extended or adjusted under 35 U.S.C. 154(b) by 0 days.

(21) Appl. No.: 15/580,468

(22) PCT Filed: May 31, 2016

(86) PCT No.: PCT/EP2016/062304
§ 371 (c)(1),
(2) Date: Dec. 7, 2017

(87) PCT Pub. No.: WO2016/198290
PCT Pub. Date: Dec. 15, 2016

(65) Prior Publication Data
US 2018/0191258 A1     Jul. 5, 2018

(30) Foreign Application Priority Data

Jun. 9, 2015   (EP) ................................ 15171230

(51) Int. Cl.
*H02M 3/335*   (2006.01)
*H02M 3/337*   (2006.01)
(Continued)

(52) U.S. Cl.
CPC ....... *H02M 3/33584* (2013.01); *H02M 1/088* (2013.01); *H02M 3/337* (2013.01);
(Continued)

(58) Field of Classification Search
CPC .... H02M 3/24; H02M 3/335; H02M 3/33507; H02M 3/3376; H02M 3/338; H02M 1/00;
(Continued)

(56) References Cited

U.S. PATENT DOCUMENTS 5,027,264 A * 6/1991 DeDoncker ....... H02M 3/33584
363/129
8,593,831 B2 * 11/2013 Rojas .................... H02M 3/335
363/21.02
(Continued)

*Primary Examiner* — Yemane Mehari
(74) *Attorney, Agent, or Firm* — Reinhart Boerner Van Deuren P.C.

(57) ABSTRACT

The present invention is related to a method for controlling a high frequency dual bridge DC/DC power converter of nominal frequency ($f_N$) and nominal power ($P_N$), in a wide range of input voltage and with power overload capacity up to 200%, said method comprising a step of varying, in a range up to the value of π radians, a first phase shift ($\varphi_{HB}$) between the voltage of the full bridge and the voltage of the half bridge, while—varying the operation frequency (f) simultaneously with the said first phase shift and/or—inducing a second phase shift ($\varphi_{FB}$) between the voltages of the two half bridges or branches constituting the full bridge, modifying thereby the first phase shift ($\varphi_{HB}$) between the voltage of the full bridge and the voltage of the half bridge and/or—decreasing the operation frequency (f) towards the LC resonance frequency ($f_0$) of the circuit, so as to minimize the switch losses in the DC/DC converter during operation.

8 Claims, 11 Drawing Sheets

(51) Int. Cl.
*H02M 1/088* (2006.01)
*H02M 1/00* (2006.01)

(52) U.S. Cl.
CPC .............. *H02M 3/33592* (2013.01); *H02M 2001/0058* (2013.01); *Y02B 70/1475* (2013.01); *Y02B 70/1491* (2013.01)

(58) Field of Classification Search
CPC .. H02M 1/08; H02M 1/88; H02M 2001/0058; Y02B 70/1433; Y02B 70/1491
USPC .............................. 363/15–17, 20, 21.04, 27
See application file for complete search history.

(56) References Cited

U.S. PATENT DOCUMENTS

| | | | |
|---|---|---|---|
| 2014/0092634 A1 | 4/2014 | Yan et al. | |
| 2017/0214321 A1* | 7/2017 | Li | H02M 3/33584 |
| 2018/0048240 A1* | 2/2018 | Hayasaki | H02M 3/33584 |

* cited by examiner

DUAL BRIDGE DC/DC POWER CONVERTER

FIELD OF THE INVENTION

The present invention is related to a new high frequency DC/DC power converter operation based on the single phase bidirectional active dual bridge DC/DC converter topology disclosed in U.S. Pat. No. 5,027,264.

PRIOR ART

A hardware topology for a DC/DC power converter disclosed in U.S. Pat. No. 5,027,264 is shown in FIG. 1. As detailed on the figure, the power converter comprises:

- an input converter 100 adapted to receive a DC input voltage 10 from a DC source having a first terminal 11 and a second terminal 12 and containing a gate controlled full-bridge circuit made of a first half bridge comprising a first switch $S_1$ and a second switch $S_2$, said first switch $S_1$ being connected between the first terminal 11 and a common terminal 13 between the first switch $S_1$ and the second switch $S_2$ and said second switch $S_2$ being connected between the second terminal 12 and said common terminal 13 between the first switch $S_1$ and the second switch $S_2$ and a second half-bridge comprising a third switch $S_5$ and a fourth switch $S_6$, said third switch $S_5$ being connected between the first terminal 11 and a common terminal 14 between the third switch $S_5$ and the fourth switch $S_6$ and said fourth switch $S_6$ being connected between the second terminal 12 and said common terminal 14 between the third switch $S_5$ and the fourth switch $S_6$;
- a transformer 200 having a primary winding 210, a secondary winding 220 and a leakage inductance, $L_1$, seen from the primary, the primary 210 being connected between the common terminal 13 between the first switch $S_1$ and the second switch $S_2$ and the common terminal 14 between the third switch $S_5$ and the fourth switch $S_6$, for receiving the output of the input converter 100;
- an output converter 300 connected to the secondary 220 of the transformer 200 for converting the AC voltage at the secondary to a DC output voltage 20 between a third terminal 21 and a fourth terminal 22, the output converter 300 comprising a first capacitor $C_3$ and a second capacitor $C_4$ in series, said first capacitor $C_3$ being connected between the third terminal 21 and a common terminal 15 between the first capacitor $C_3$ and the second capacitor $C_4$ and said second capacitor $C_4$ being connected between the fourth terminal 22 and said common terminal 15 between the first capacitor $C_3$ and the second capacitor $C_4$, and comprising a gate controlled half-bridge circuit, made of a fifth switch $S_3$ and a sixth switch $S_4$, said fifth switch $S_3$ being connected between the third terminal 21 and a common terminal 16 between the fifth switch $S_3$ and the sixth switch $S_4$ and said sixth switch $S_4$ being connected between the fourth terminal 22 and the common terminal 16 between the fifth switch $S_3$ and the sixth switch $S_4$, the secondary of the transformer 220 being connected between the common terminal 16 between the fifth switch $S_3$ and the sixth switch $S_4$ and the common terminal 15 between the first capacitor $C_3$ and the second capacitor $C_4$.

The basic principle of operation is consisting of controlling switches in all or nothing mode with duty cycles of 50%. A DC voltage $V_{in}$ is provided to an input full bridge having switches $S_1$, $S_2$, $S_5$ and $S_6$ at the primary side of the transformer 1:n. The voltage at the secondary of the transformer is provided to an output half-bridge with switches $S_3$, $S_4$ delivering the DC output voltage $V_{out}$. Capacitors $C_3$ and $C_4$ constitute a capacitive divider, so that $V_{mid}=V_{out}/2$, where $V_{mid}$ is the voltage at the junction of the two capacitors $C_3$ and $C_4$.

At the level of the full bridge, one has:
- 50% of the time, $S_1$, $S_6$ are ON and $S_2$, $S_5$ are OFF:$V_1$ is then equal to $+V_{in}$;
- 50% of the time, $S_1$, $S_6$ are OFF and $S_2$, $S_5$ are ON:$V_1$ is then equal to $-V_{in}$.

At the level of the half bridge, one has:
- 50% of the time, S3 is ON and S4 is OFF:V2 is then equal to −Vout/2n;
- 50% of the time, S3 is OFF and S4 is ON:V2 is the equal to −Vout/2n.

The power control is operated by acting on the phase shift ($\varphi$) between the commands of the full bridge and the commands of the half bridge. The time variation of voltages $V_1$, $V_2$ et current $I_{L1}$ are depicted in FIG. 2 in the case where $V_{in}=V_{out}/2n$, wherein $I_{L1}$ is the leakage inductance current of the transformer and/or an external inductance current.

Time Ranges

In time range $dt_1$, $V_1$ et $V_2$ are equal and positive and current IL is positive and constant. Transmitted power is then positive:$P=V_1*I_L$. In time range $dt_2$, $V_1$ is negative and $V_2$ is positive, thus current IL decreases. In this time range, transmitted average power is zero. However currents are not null and thus contribute to the losses in the converter. In time range $dt_3$, $V_1$ and $V_2$ are equal and negative, thus current IL is negative and constant. Transmitted power is then positive: $P=V_1*I_L$. In time range $dt_4$, $V_2$ is negative and $V_1$ is positive, thus current IL increases. In this time range, transmitted average power is zero. Again currents are not null and thus contribute to the losses of the converter.

Condition for ZVS Operation

The advantage of the above topology lies in the use of switches having losses during ON setting which are extremely weak, thanks to ZVS (zero voltage switching) commutations (see FIG. 3). However, even in this case, minimum currents are necessary in order to assure ZVS commutations.

At the level of the half bridge, $i_1$ has to be positive and greater than $+I_{HB\_ZVS\_limit}$. Also $i_3$ has to be negative and less than $-I_{HB\_ZVS\_limit}$.

At the level of the full bridge, $i_2$ has to be positive and greater than $+I_{FB\_ZVS\_limit}$. Also $i_4$ has to be negative and less than $-I_{FB\_ZVS}$_limit.

To get ZVS commutations, the current should not change its sign and be minimum so that the switch opens naturally. $I_{HB\_ZVS\_limit}$ and $I_{FB\_ZVS}$_limit are the minimum currents for guarantying ZVS commutations and depend namely on parasitic capacities in parallel with the switches and on the «dead times» between switches of a same branch.

Influence of Input and Output Voltages on the Current $I_L$ Shape

Case $n*V_{in}>V_{out}/2$ (FIG. 4)

Switching currents at the level of the half bridge are weaker in absolute value than switching currents at the level of the full bridge.

The condition for ensuring the ZVS operation et the level of the half bridge is:

$$\varphi_{HB\_ZVS\_limit} = \frac{4I_{HB_{ZVS_{limit}}} \cdot fL - V_{out}/2 + nVin}{2nV_{in}} - \frac{L \cdot V_{out}}{L_m \cdot 4n \cdot V_{in}} \quad \text{(Eq. 1)}$$

with $L=L_1 \cdot n^2$, $I_{HB\_ZVS\_limit}$ seen from the half bridge side and $L_m$ being the magnetizing self of the transformer seen from half bridge side.

Case $n^*V_{in} < V_{out}/2$ (FIG. 5)

Switching currents at the level of the full bridge are weaker in absolute value than the switching currents at the level of the half bridge.

The condition for ensuring the ZVS operation at the level of the full bridge is:

$$\varphi_{FB\_ZVS\_limit} = \frac{4I_{FB_{ZVS_{limit}}} \cdot fL + V_{out}/2 - nVin}{V_{out}} \quad \text{(Eq. 2)}$$

with $L=L_1 \cdot n^2$ and $I_{FB\_ZVS\_limit}$ seen from half bridge side.

In summary the more $n^*V_{in}$ is different from $V_{out}/2$, the more the ZVS operation zone diminishes.

The transmitted power is $$P_{out} = \frac{nV_{in}V_{out}}{4fL}\varphi(1-|\varphi|) \quad \text{(Eq. 3)}$$

Power is proportional to input ($V_{in}$) and output ($V_{out}$) voltages. Power is inversely proportional to frequency. Influence of phase shift on output power is given in FIG. 6. Note that φ is expressed in percentage of π.

Operation Zone and Comparison Between RMS Currents

For $n \cdot V_{in} = V_{out}/2$, one has:

$$I_{transfo\_RMS} = \left(\frac{V_{out}}{4fL}\right) \cdot \varphi \cdot \left(\sqrt{\frac{2\varphi}{3}} + 1 - \varphi\right) \quad \text{(Eq. 4)}$$

The graph of FIG. 7 corresponds to a converter dimensioned for obtaining an overload power of 150% with a phase shift of 27% of π. This graph brings out that:

1) The current in the transformer increases more rapidly than the output current. Losses being proportional to $I^2$, this type of topology thus loses its attractiveness for a phase shift greater than 25% of π.
2) Below a 7% phase shift, switching currents are not sufficiently high anymore in order to ensure ZVS operation. It follows that losses are much higher at high frequency which, in some cases, can lead to destruction of the switches (such as MOSFETs). In case of such a dimensioning, this topology becomes virtually unusable below half of nominal power ($P_{n/2}$). Moreover, as explained above, when input voltage $n \cdot V_{in}$ is different from $V_{out}/2$, ZVS is much reduced.

In conclusion, this topology is bidirectional and presents an operation range for which the circulation currents are weak and for which the operation of switches is in ZVS mode. Unfortunately this operation range is somewhat limited and represents a real problem in the use of the converter in a large input voltage range and in overload capacity up to 200%.

A number of methods are expected to be used for relieving the above-mentioned limitations of the converter:

A) Use a variable inductance.
   This allows extending the ZVS operation range and reducing the circulation currents at high power. But this does not solve one hundred percent the problem and variable inductance creates an additional cost for the converter.
B) Vary the phase shift between the two switch branches of the full bridge.
   This allows slightly extending the ZVS operation range for voltage such as n·Vin>Vout. But this is far from solving one hundred percent the problem.
C) For the low powers, vary the duty cycle of the different branches.
   Numerous operation modes are already existing (triangle, trapezoidal, etc.). In some cases it may be that all switches are open and a detection system of low voltages (minimum valley point) has to be set up in order to guarantee minimum losses of commutation.
   This method allows utilizing a low power converter and this with reduced commutation losses (not always perfectly ZVS). PWM commands being at variable duty cycle, an isolated command is complicated and will generate an extra cost about an isolated command at fixed duty cycle of 50%.
   It is also to be noted that a command at fixed duty cycle of 50% easily allows performing a setup OFF of the MOSFET with a negative voltage (−2V setup OFF, 10V setup ON).

Document US 2014/0092634 A1 discloses a mixed control method for a resonant converter, a resonant converter system and a mixed controller. When the resonant converter operates in a case where a voltage gain is less than a predetermined value, the method includes: setting a mixed control start frequency, a mixed control stop frequency and a slope of a phase-shifting angle; detecting an operating frequency of the converter; calculating a time delay of phase shifting according to the slope, the mixed control start frequency, the mixed control stop frequency and a resonant frequency of the resonant converter; and according to the time delay, the mixed control start and stop frequencies, generating a control signal to adjust the operating frequency and the phase-shifting angle of the resonant converter. The present application can realize a relatively low voltage gain and a small circuit loss, thereby the circuit efficiency may be improved.

AIMS OF THE INVENTION

The present invention aims at providing a solution allowing to overtake the drawbacks of prior art when operating a single phase dual bridge DC/DC converter topology like the one disclosed in U.S. Pat. No. 5,027,264.

In particular the invention intends to provide a method of operation of said converter in a wide range of input voltages and in overload capacity up to about 200%, in which the circulation currents remain acceptable and with switch operation remaining in the ZVS mode for all the operation range, even at zero power.

SUMMARY OF THE INVENTION

The present invention relates to a method for controlling a high frequency dual bridge DC/DC power converter of nominal frequency ($f_N$) and nominal power ($P_N$), in a wide range of input voltage and with power overload capacity up to 200%, the circuit of said DC/DC power converter being disclosed in U.S. Pat. No. 5,027,264 A, and comprising:

an input converter adapted to receive a DC input voltage from a DC source having a first terminal and a second terminal and containing a gate controlled full-bridge circuit made of a first half bridge comprising a first switch and a second switch, said first switch being connected between the first terminal and a common terminal between the first switch and the second switch and said second switch being connected between the second terminal and said common terminal between the first switch and the second switch and a second half-bridge comprising a third switch and a fourth switch, said third switch being connected between the first terminal and a common terminal between the third switch and the fourth switch and said fourth switch being connected between the second terminal and said common terminal between the third switch and the fourth switch;

a transformer having a primary winding, a secondary winding and a leakage inductance, the primary being connected between the common terminal between the first switch and the second switch and the common terminal between the third switch and the fourth switch, for receiving the output of the input converter;

an output converter connected to the secondary of the transformer for converting the AC voltage at the secondary to a DC output voltage between a third terminal and a fourth terminal, the output converter comprising a first capacitor and a second capacitor in series, said first capacitor being connected between the third terminal and a common terminal between the first capacitor and the second capacitor and said second capacitor being connected between the fourth terminal and said common terminal between the first capacitor and the second capacitor, and comprising a gate controlled half-bridge circuit, made of a fifth switch and a sixth switch, said fifth switch being connected between the third terminal and a common terminal between the fifth switch and the sixth switch and said sixth switch being connected between the fourth terminal and the common terminal between the fifth switch and the sixth switch ($S_4$), the secondary of the transformer being connected between the common terminal between the fifth switch and the sixth switch and the common terminal between the first capacitor and the second capacitor, control means connected to the gates of the input converter switches and to the gates of the output converter switches respectively for controlling the switching of the input converter switches in so-called zero-voltage switching mode to convert the DC source voltage to an AC output voltage at a selected frequency at the output of the input converter, and for controlling the switching of the output converter switches in so-called zero-voltage switching mode to convert the AC input voltage at the selected frequency at the input of the output converter to a DC voltage at the output of the output converter, the switching of the input converter and output converter switches being controlled to provide a phase shift between the voltages at the primary and secondary of the transformer, said method comprising a step of varying, in a range up to the value of π radians, a first phase shift between the voltage delivered by said full bridge and the voltage delivered by said half bridge.

The method of the present invention is characterised by the fact that, in all embodiments, the operation frequency is simultaneously varied with said first phase shift, so as to minimize the switch losses in the DC/DC converter during operation.

According to preferred embodiments, the method of the invention further comprises one, or a suitable combination, of the following characteristics:

a second phase shift is induced between the voltages delivered respectively by the two half bridges or branches constituting the full bridge, modifying thereby the first phase shift between the voltage delivered by the full bridge and the voltage delivered by the half bridge;

the operation frequency is decreased towards the LC resonance frequency of the converter;

the operation frequency is increased up to 4 times the nominal frequency;

the operation frequency f is varied so that $f_0/f<0.75$, $f_0$ being the resonance frequency of the converter;

the second phase shift or phase shift within the full bridge is up to 165% of π at no-load operation of the converter;

the first phase shift or phase shift within the full bridge ($\varphi_{FB}$) is ruled by the following algorithm when the second phase shift or phase shift between the half bridge and the full bridge ($\varphi_{HB}$) overcomes 35%:

If ($\varphi_{HB}>0.35$) then $\varphi_{FB}=1+\varphi_{HB}-0.35$; otherwise $\varphi_{FB}=1$.

DESCRIPTION OF A PREFERRED EMBODIMENT OF THE INVENTION

Here below is presented a new method of using the power converter in order to relieve the above-mentioned converter limitations.

Figure 7:
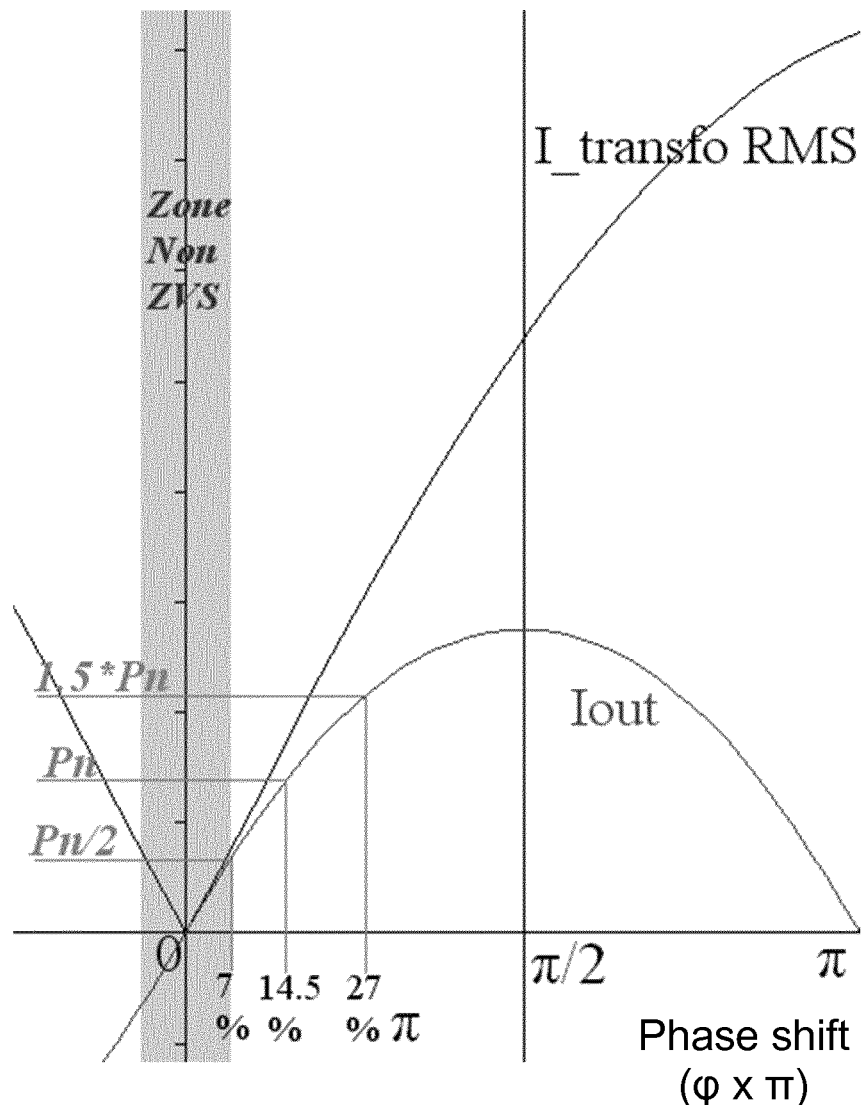
FIG. 7 shows the influence of phase shift on output power and transformer RMS current.

The base idea of the present invention is never going into the «non ZVS» zone. The power annulation will be performed by getting a phase shift of 100% of π. However, at this operation point, the currents in the transformer and in the switches are normally about 4.8 times greater than the currents present at nominal power (FIG. 7). $I^2$ losses are therefore much too big.

Figure 8:
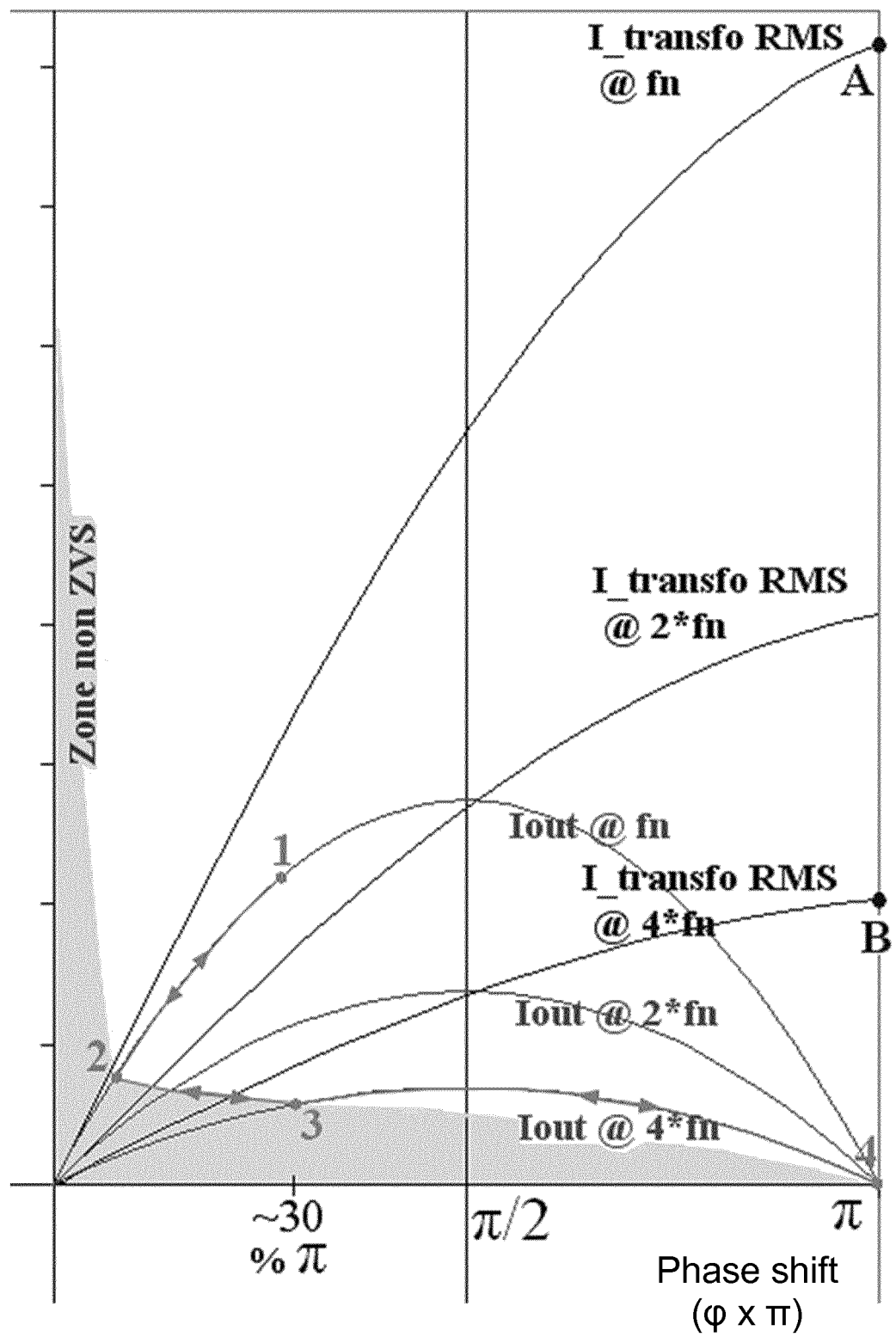
FIG. 8 depicts the ZVS operation mode of the invention with transformer current reduction and frequency increase.

Three techniques will allow diminishing these currents in case of phase shift increase:
1) Increase the frequency in the same time as the phase shift and this in order to keep at the limit of the ZVS zone.
   FIG. 8 describes this operation mode focusing on the current reduction in the transformer while frequency is increasing. At point 1, the converter operates at maximum power and at nominal frequency. Decreasing the phase shift at constant frequency allows power reduction up to the operation limit ZVS (point 2). The frequency increase in the same time as the phase shift increases again then allows diminishing again the output power up to point 3. It is to be noted that the move from point 2 to point 3 is an operation mode on the limit of the ZVS zone. The increase of the phase shift at constant frequency then allows to meet point 4 which represents an operation mode at zero power. The increase of the frequency by a factor 4 has thus allowed diminishing the current in the transformer and in the switches also by a factor of 4 (point A→point B).
2) Vary the phase shift between both switch branches of the full bridge.
   Simulations show that the addition of this phase shift from point 3 of FIG. 8 allows an additional reduction of the currents in the transformer and in the switches in the operation mode of the converter at low power. Below is a simple empirical algorithm which allows playing on the phase shift of full bridge (φFB) when the phase shift of half bridge (φHB) exceeds 35%:

If $(\varphi_{HB} > 0.35)$ then $\varphi_{FB} = 1 + \varphi_{HB} - 0.35$;

otherwise $\varphi_{FB} = 1$               (Eq. 5)

Figure 9:
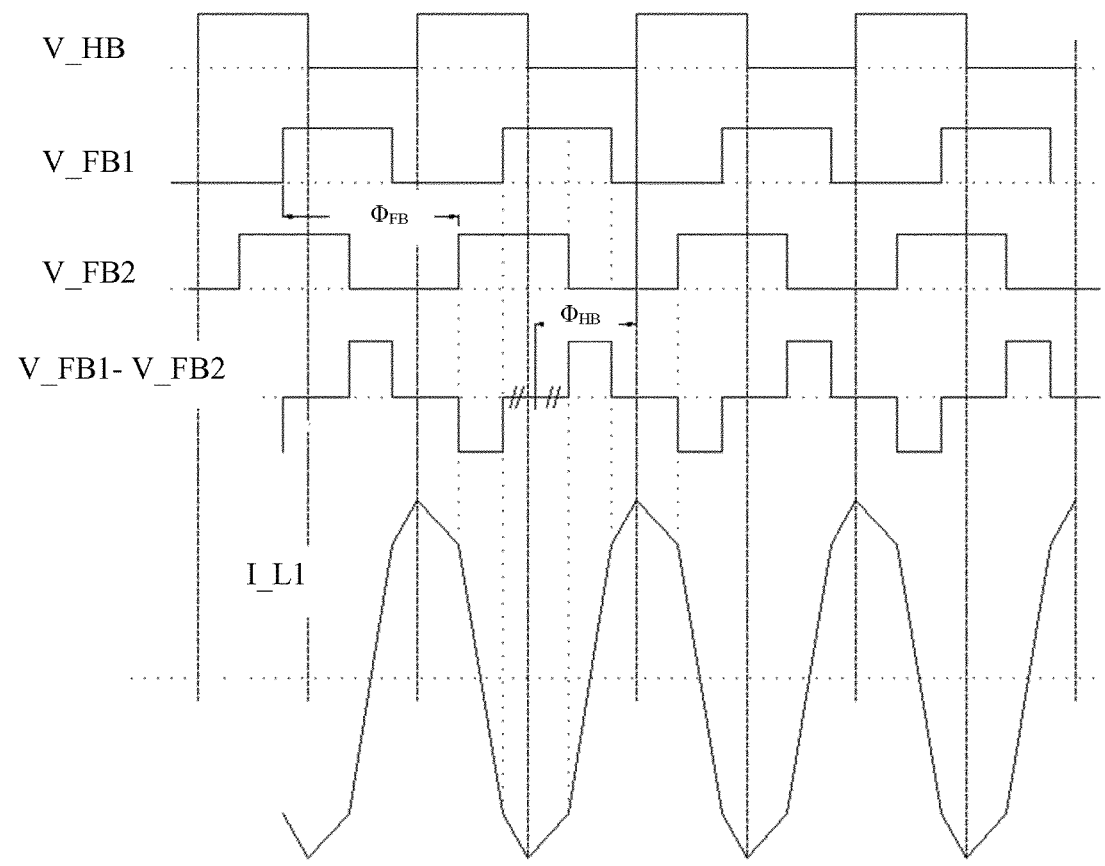
FIG. 9 shows the definition of the phase shifts between the two branches of the full bridge and between the half bridge and the full bridge respectively.
Figure 10:
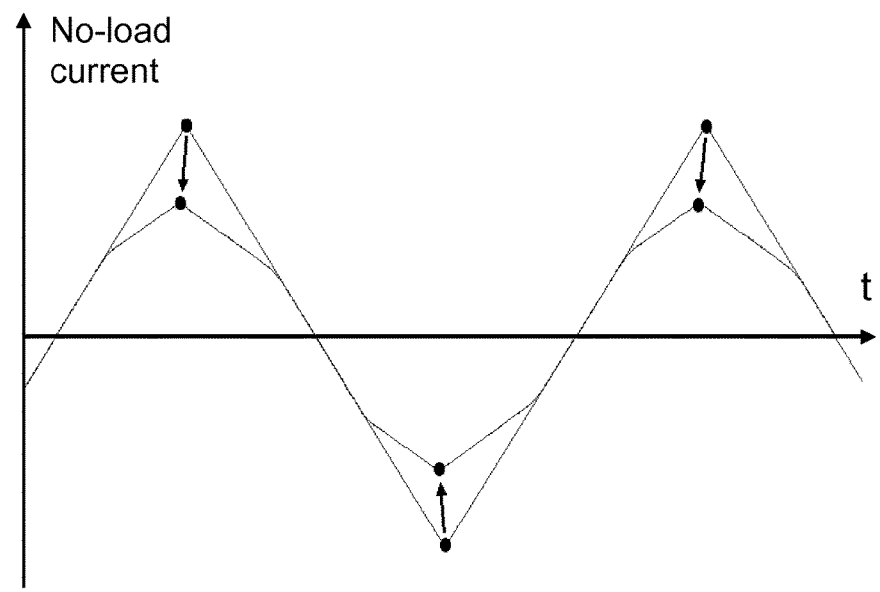
FIG. 10 shows the clipping of no-load current thanks to additional phase shift.

FIG. 9 shows the definitions of the various phase shifts considered here, when the phase shift is varied between the different branches of the full bridge. $\varphi_{FB}$ is the phase shift between the squared voltages of the respective first branch (V_FB1) and second branch (VFB_2) of the full bridge. The rising edges of the signals are used to this end. $\varphi_{HB}$ is the phase shift between the differential voltage V_FB1-V_FB2, which is also the voltage at the primary of the transformer (V1) and the half bridge voltage V_HB. The conventional reference point on the differential voltage, which is a stepped squared signal is taken as the origin of the fundamental (sinusoidal) frequency of this signal. As before the phase shift of full bridge was at 100%, it can increase now using the above algorithm up to 165% for a no-load operation mode of the converter. This involves a reduction by a factor ~1.38 of the no-load circulation current in the converter. FIG. 10 shows how the no-load current is clipped thanks to this additional phase shift (the arrow shows the reduction of current switching). The commutation currents are heavily reduced (factor ~2) and the shape of current is more sinusoidal which reduces the losses in the magnetics. The introduction of the phase shift between the branches of the full bridge allows a better power transfer in the system.
3) Dimension the converter in order to approach resonance frequency of the circuit (L, C3, C4)
   Going from point 3 to point 2, the frequency of the converter is reduced and one can, via suitable dimensioning of capacitors C3, C4 approach the resonance frequency ($f_n > f_0$). The power expression given above in (Eq. 3) is then not correct anymore because it is too approximate. One should then take into account the resonance frequency $f_0$:

$$P_{Out} = \frac{nV_{in}V_{out}}{4fL} \times function(\delta, \varphi) \quad (Eq.\ 6)$$

with $\delta = \pi/2 \times f_0/f$, $f_0 = 1/2\pi\sqrt{LC}$ and $C = C_3 + C_4$.

In comparison with (Eq. 3), which is a power expression without taking into account resonance, it is noted that one factor stays unchanged:

$$\frac{nV_{in}V_{out}}{4fL}.$$

Figure 11:
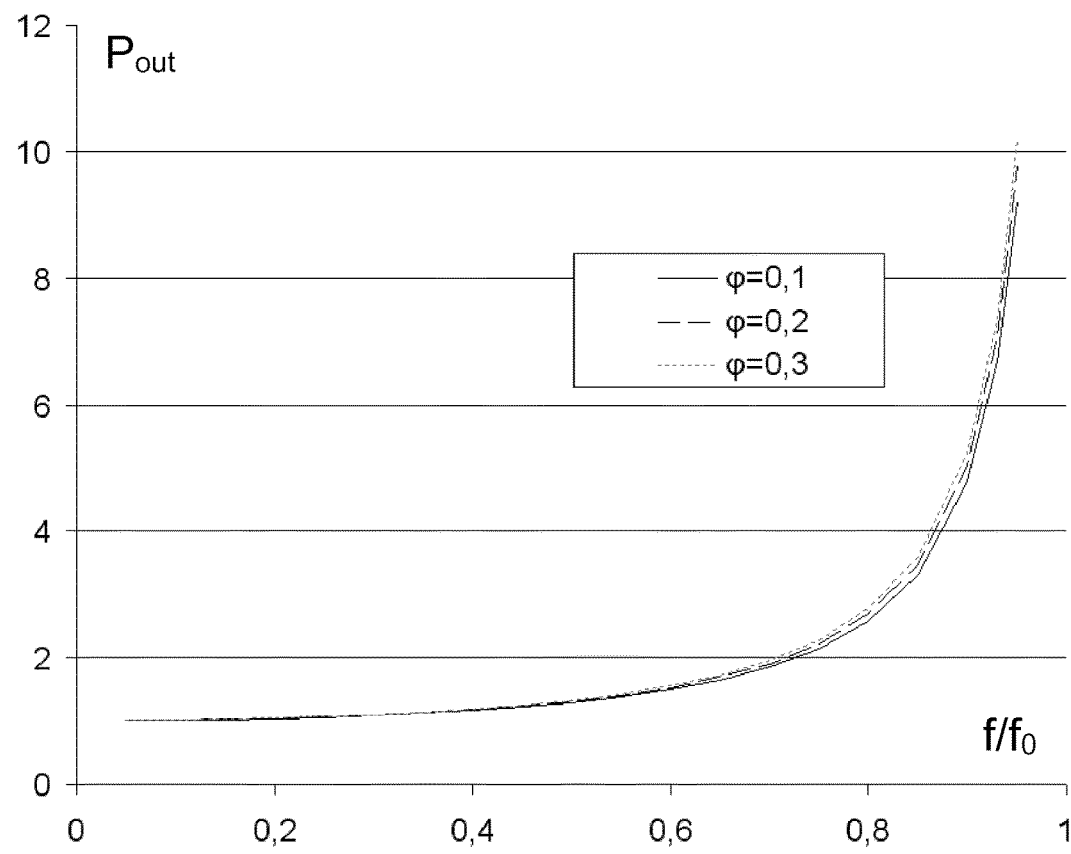
FIG. 11 shows the effect of resonance on output power as a function of ratio $f_0/f$ and for different phase shift angles.

In order to estimate the influence of ratio $f_0/f$ on the power, the graph of FIG. 11 represents the evolution of the power ratio r between Eq. 6 and Eq. 3:

$r = function(\delta, \varphi)/\varphi(1-|\varphi|)$         (Eq. 7)

In particular FIG. 11 shows the effect of resonance on power as a function of ratio $f_0/f$:
   when the converter frequency is much greater than the resonance frequency, there is no multiplicative effect of power and one comes back to (Eq. 3) with r=1;
   when the converter frequency approaches the resonance frequency, the multiplicative effect on the power is asymptotic at $f = f_0$.

One also sees on the figure that the effect of the phase shift on this ratio is weak.

In the conception of the converter according to the invention, it was practically and advantageously opted not to go beyond the ratio $f_0/f = 0.75$ in order not to overstress the resonance capacitors C3, C4. This allows however to multiply the power by a factor ~2.2. Thus, in order to keep a maximum module power identical to the origin, one has to increase the self in series L by a factor ~2.2. This increase of inductance value has a beneficial effect on the operation at low power and no-load (operation between point 3 and 4 @ 4 $f_n$). RMS currents in the transformer and switches will be thus 2.2 times weaker (the resonance effect is negligible @4 $f_n$).

Figure 12:
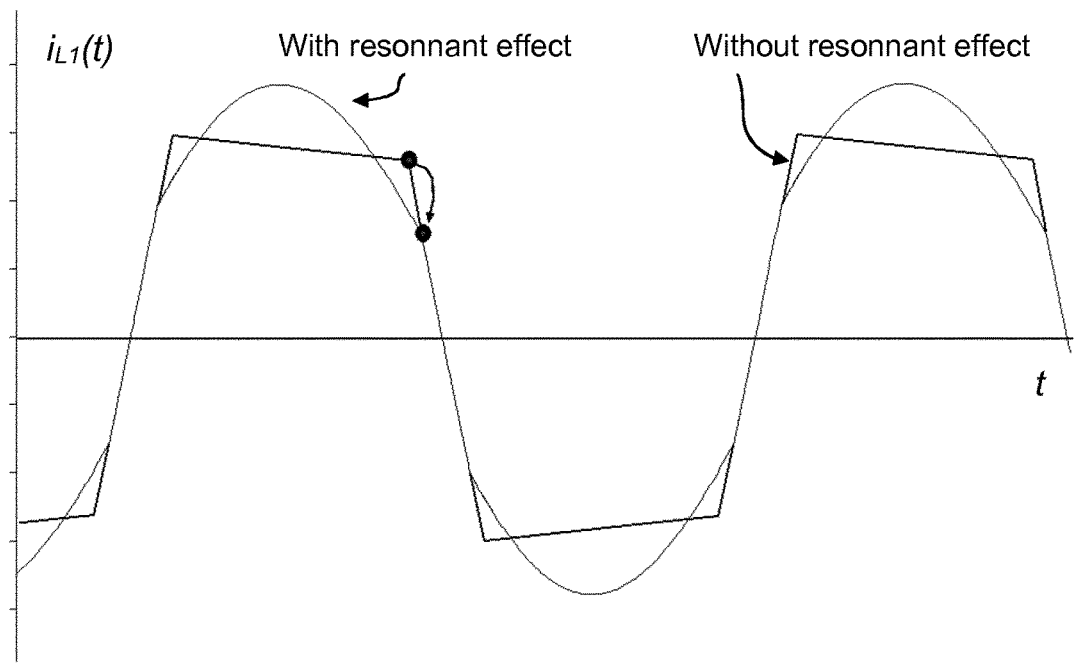
FIG. 12 shows the beneficial effect of resonance operation on the transformer current shape.

The other beneficial effects of the use of the resonance in this topology are (see FIG. 12):
   reduction of commutation currents causing less losses at switch opening;
   current more sinusoidal thus with less harmonics at high frequency causing less copper losses in the magnetics;
   lower proportion between circulation current et useful current.

As a conclusion, while the skilled person in the art was strongly deterred from cancelling the power by going to «π phase shift» in the discussed converter topology on the grounds that the circulation currents were much too high in the magnetics and switches (~4.8 $1_n$), the inventors however have described the following conditions for reducing these no-load and low power circulation currents:
   increase frequency up to a factor 4 (or more, depending on particular design) inducing a reduction by a factor 4 of the no-load circulation current;

act on the phase shift of the full bridge: up to 165% (or slightly more, depending on particular design) inducing a reduction by a factor 1.38 on the no-load circulation current;

use the resonance effect which, while increasing output power for a given inductance, allows then to increase the value of the inductance in series by a factor of 2.2 causing reduction of a factor 2.2 of the no-load circulation current.

Upon no-load, the circulation current will thus be about $4.8 \times \ln/(4 \times 1.38 \times 2.2) = 0.4$ ln. In terms of loss in $I^2$, this represents only 16% of the losses necessary to nominal power.

Prototype shows however that actual losses are rather around about 30% of the losses present at nominal power. This difference comes essentially out an increase of the copper losses and of commutation during frequency increase by a factor 4.

For a desired power one has to calculate the optimum frequency and phase shift in order to operate with minimum commutation currents for ensuring ZVS commutations. So one can ensure zero losses at ON setup of the switches and the weakest losses at OFF setup of the switches.

Figure 13:
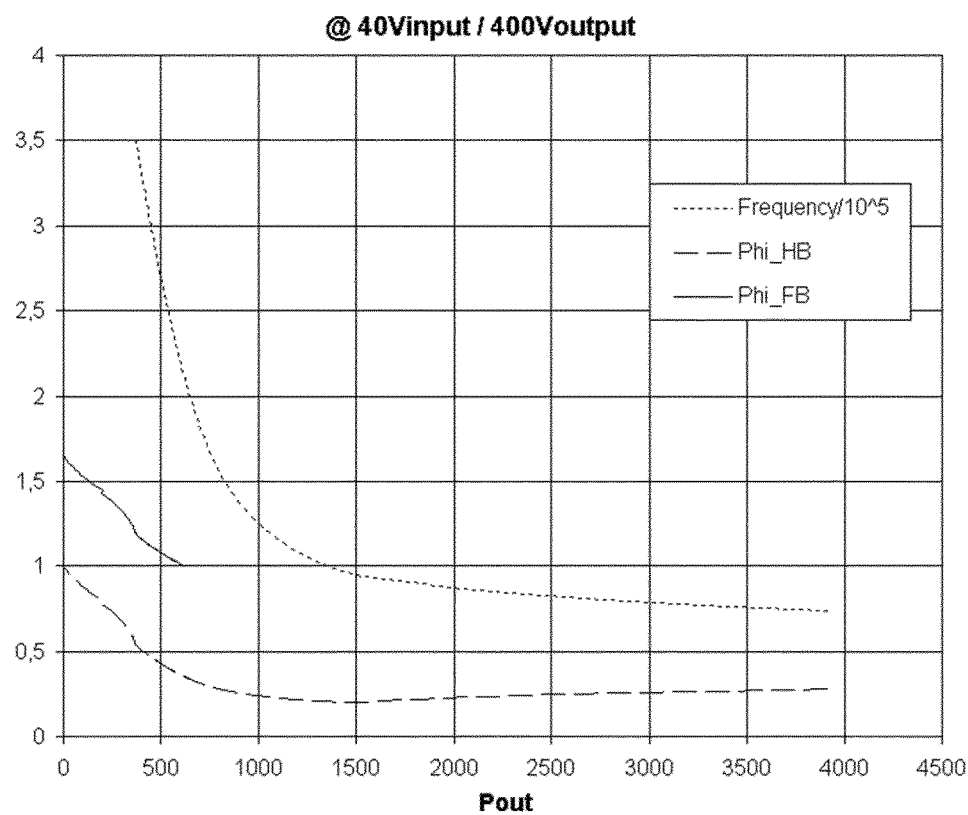
FIG. 13 shows an example of variation of frequency and phase shifts according to the converter output power.

In the case of the specifically tested converter, the resonance frequency is about 56 kHz. It was decided to limit the frequency between 75 kHz and 350 kHz. FIG. 13 shows one example of frequency and phase shifts in function of converter power.

Figure 14:
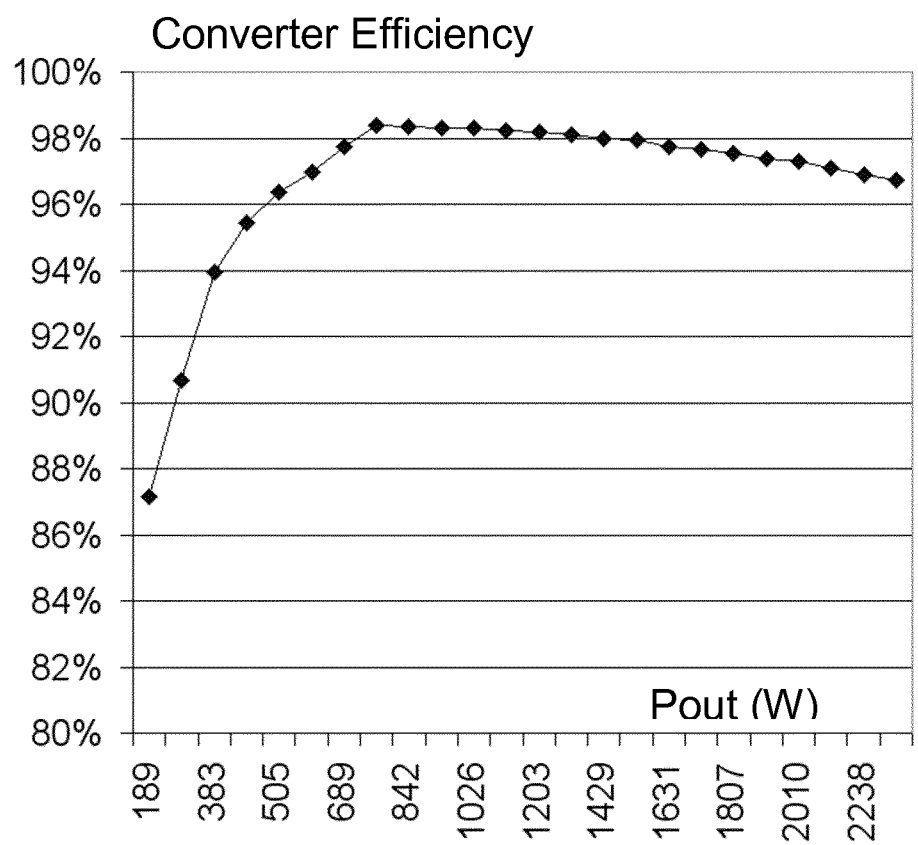
FIG. 14 shows the converter efficiency at nominal voltage (e.g. 50 Vin/400 Vout) as a function of output power.

The yield of the converter of the invention is given at nominal voltage and in function of output power, without taking in consideration the consumption of the control (FIG. 14). The yield overcomes 98% between 900 W and 1600 W.

Figure 15:
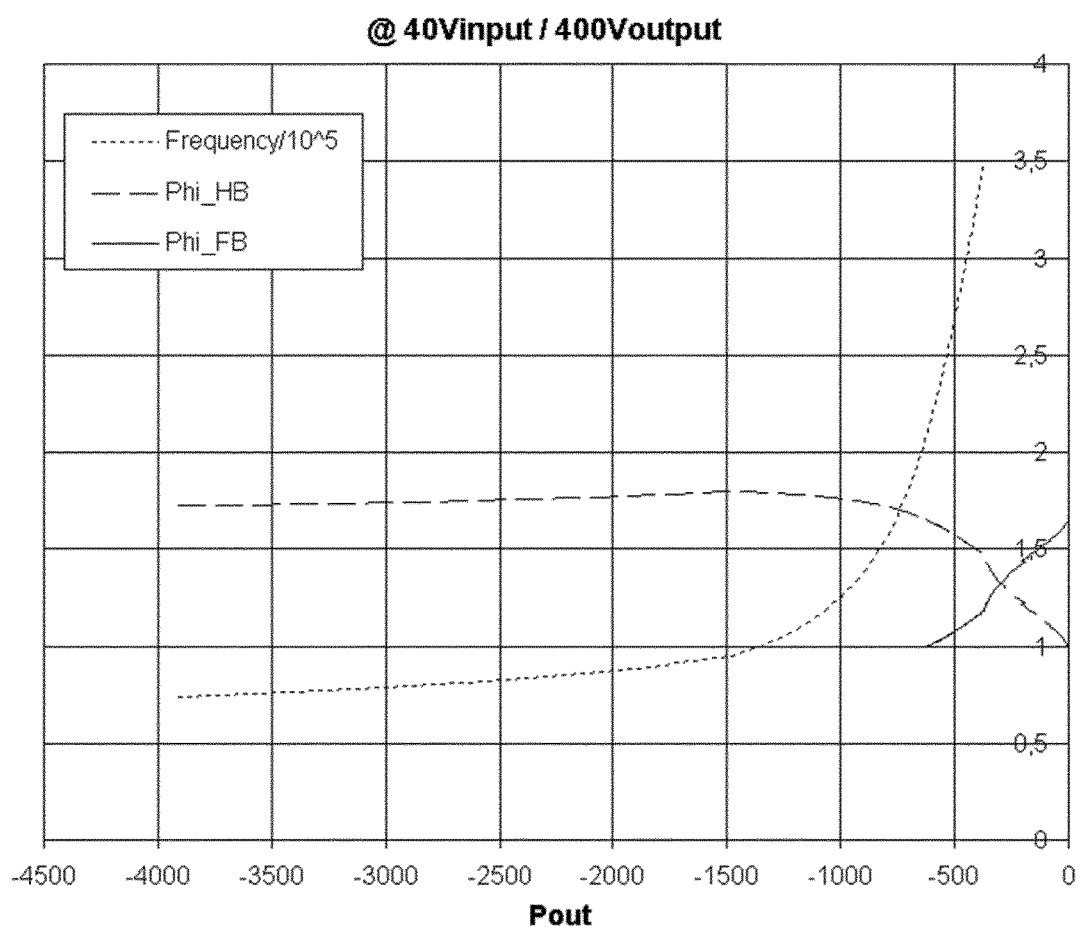
FIG. 15 shows an example of variation of frequency and phase shifts according to the output power, when the converter is used in mode rectifier.

Operation in mode rectifier, thus with a behaviour of AC/DC rectifier, is similar but with a phase shift of the half bridge varying between $\pi$ and $2\pi$. FIG. 15 shows the variation of parameters in function of power.

Figure 1:
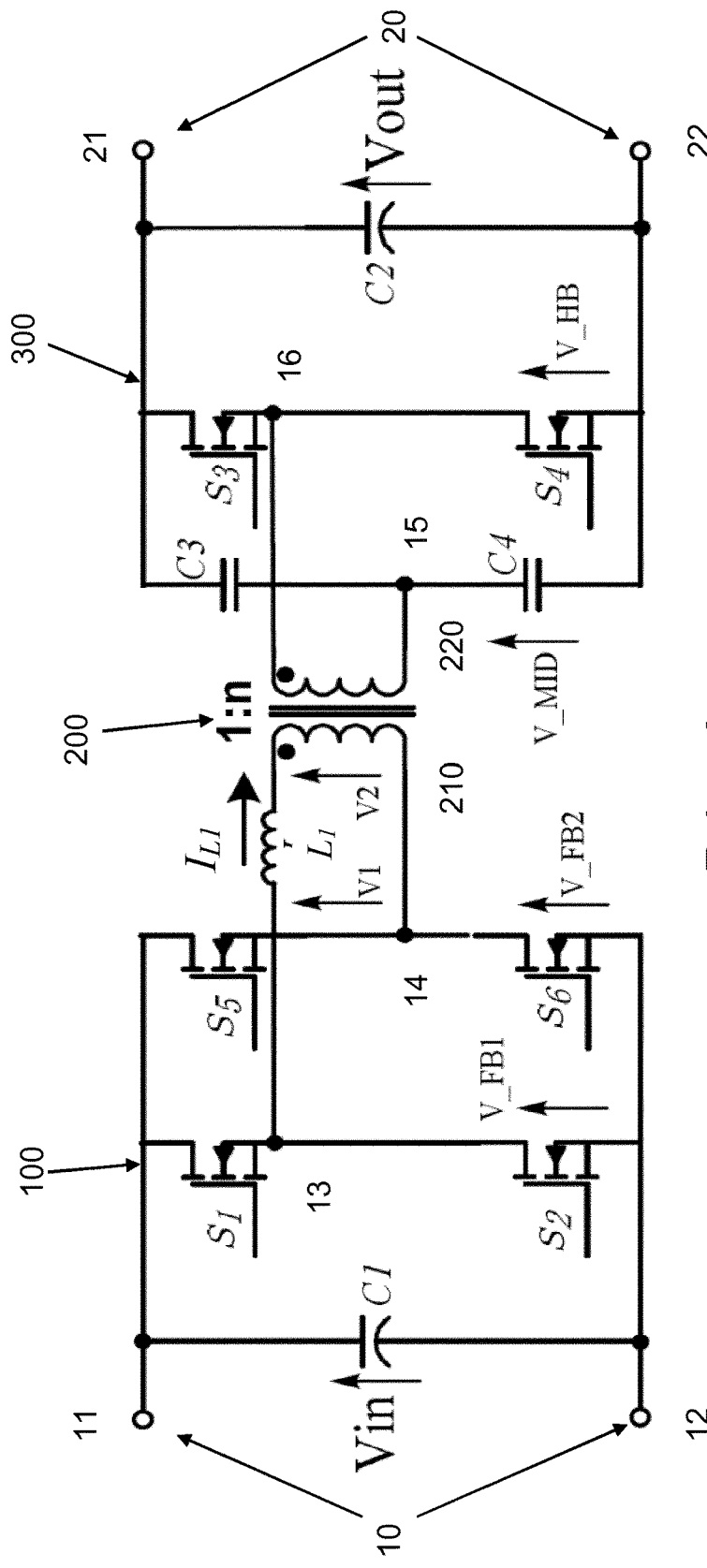
FIG. 1 schematically represents a bidirectional dual active bridge DC/DC converter with full bridge on input side and half bridge on output side.
Figure 2:
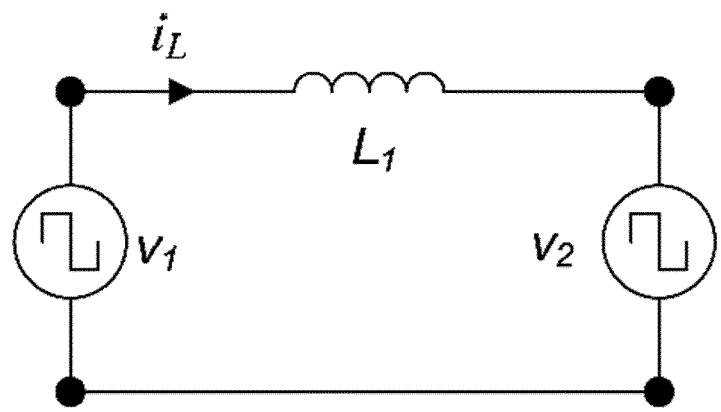
FIG. 2 represents the equivalent circuit and time variation of primary and secondary voltages and of primary current.
Figure 2:
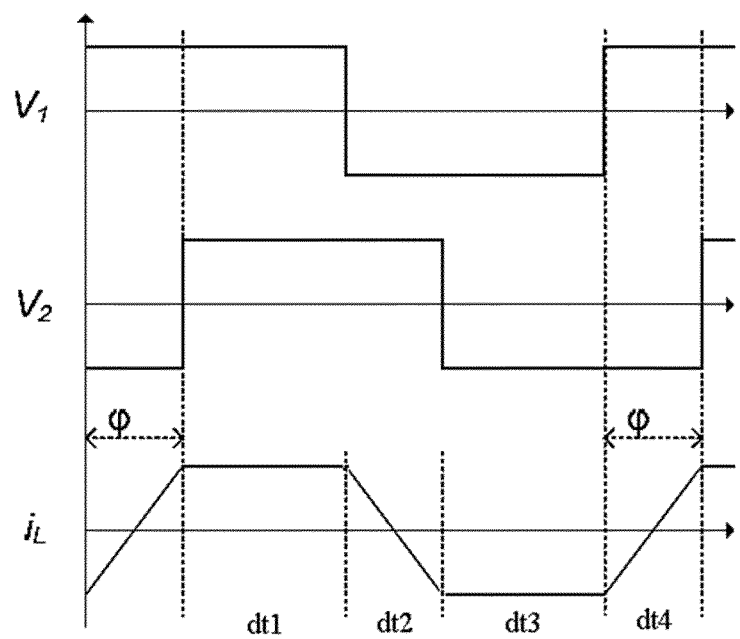
Figure 3:
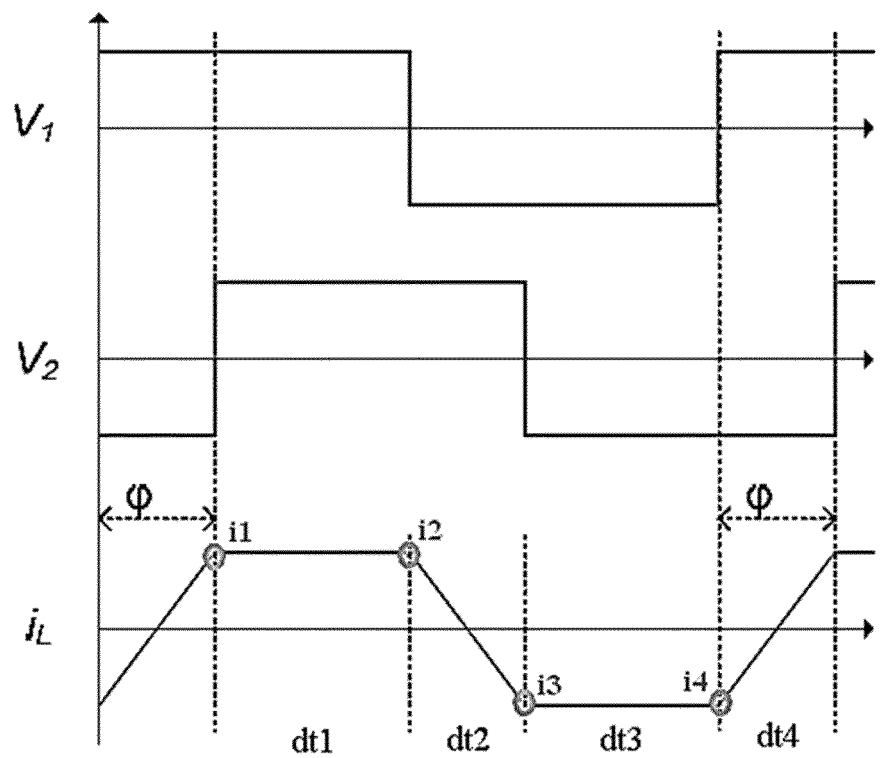
FIG. 3 depicts the currents at switch operation, especially in relation with ZVS mode.
Figure 4:
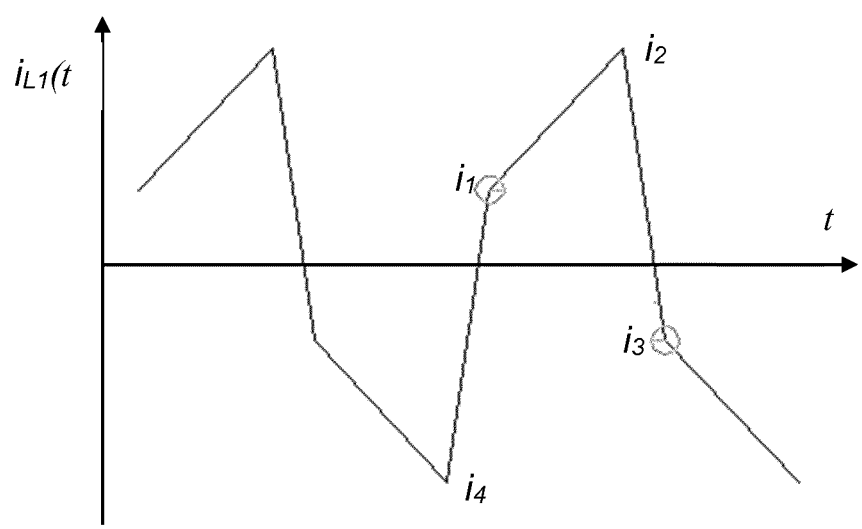
FIG. 4 shows the influence of input and output voltages on the current shape in the case $n*V_{in}>V_{out}/2$.
Figure 5:
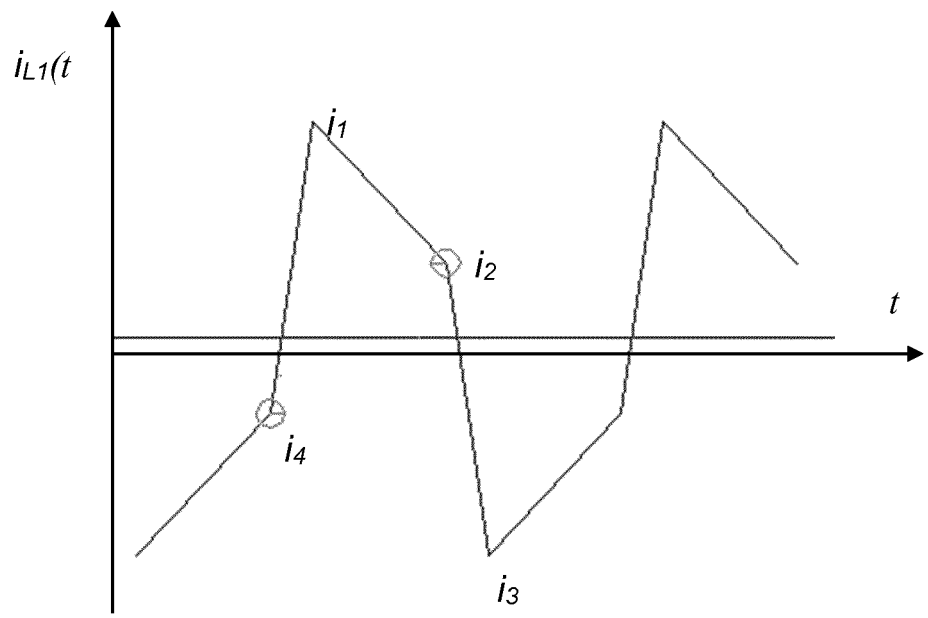
FIG. 5 shows the influence of input and output voltages on the current shape in the case $n*V_{in}<V_{out}/2$.
Figure 6:
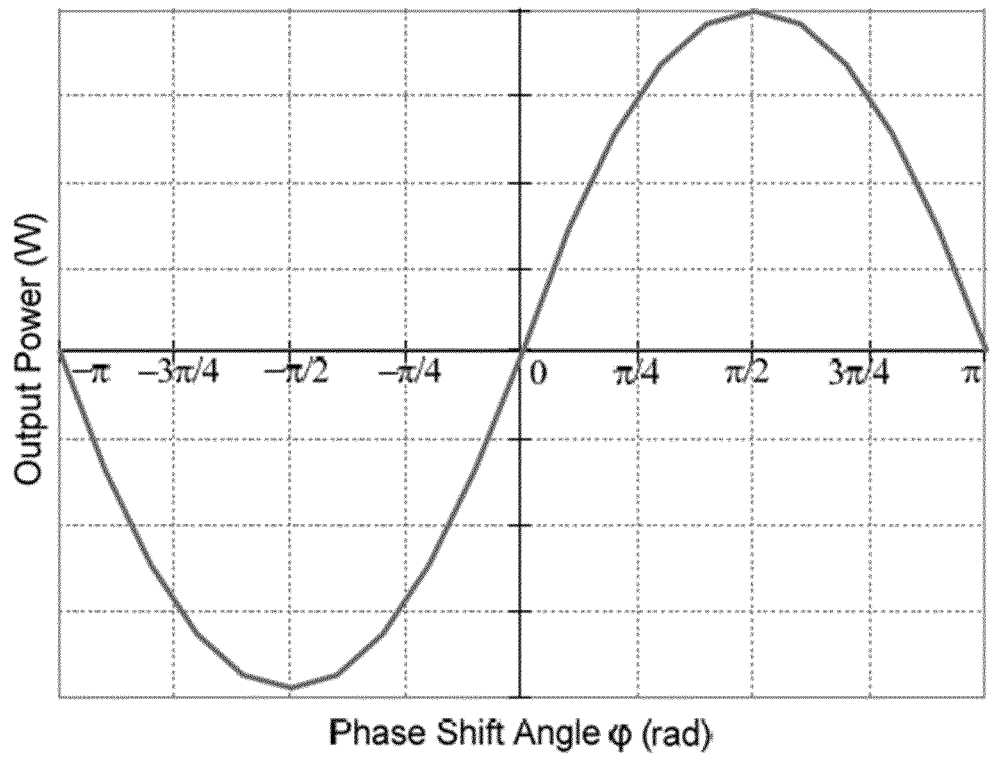
FIG. 6 shows the variation of output power with phase shift angle in the range (−π, +π).

It will be understood by the one skilled in the art that the scope of the present invention can be applied or generalized to a high frequency DC/DC power converter operation based on the single phase bidirectional active dual bridge DC/DC converter topology wherein both input and output converter are full bridge converters. In this case, capacitors $C_3$ and $C_4$ of FIG. 1 will be replaced by additional switches (which can be named for example $S_7$ and $S_8$). In this case $C_2$ possibly plays the role of resonance capacitor.

It will also be understood by the one skilled in the art that the scope of the present invention can be applied or generalized to a high frequency DC/DC power converter operation based on the single phase bidirectional active dual bridge DC/DC converter topology wherein both input and output converter are half bridge converters. In this case, switches $S_5$ and $S_6$ of FIG. 1 will be replaced by additional capacitors (which can be named for example $C_5$ and $C_6$).

The invention claimed is:

1. A method for controlling a high frequency dual bridge DC/DC power converter of nominal frequency (fN) and nominal power (PN), in a wide range of input voltage and with power overload capacity up to 200%, said DC/DC power converter comprising:

an input converter (100) adapted to receive a DC input voltage (10) from a DC source having a first terminal (11) and a second terminal (12) and containing a gate controlled full-bridge circuit made of a first half bridge comprising a first switch (S1) and a second switch (S2), said first switch (S1) being connected between the first terminal (11) and a common terminal (13) between the first switch (S1) and the second switch (S2) and said second switch (S2) being connected between the second terminal (12) and said common terminal (13) between the first switch (S1) and the second switch (S2) and a second half-bridge comprising a third switch (S5) and a fourth switch (S6), said third switch (S5) being connected between the first terminal (11) and a common terminal (14) between the third switch (S5) and the fourth switch (S6) and said fourth switch (S6) being connected between the second terminal (12) and said common terminal (14) between the third switch (S5) and the fourth switch (S6);

a transformer (200) having a primary winding (210), a secondary winding (220) and a leakage inductance (L1, seen from the primary), the primary (210) being connected between the common terminal (13) between the first switch (S1) and the second switch (S2) and the common terminal (14) between the third switch (S5) and the fourth switch (S6), for receiving the output of the input converter (100);

an output converter (300) connected to the secondary (220) of the transformer (200) for converting the AC voltage at the secondary to a DC output voltage (20) between a third terminal (21) and a fourth terminal (22), the output converter (300) comprising a first capacitor (C3) and a second capacitor (C4) in series, said first capacitor (C3) being connected between the third terminal (21) and a common terminal (15) between the first capacitor (C3) and the second capacitor (C4) and said second capacitor (C4) being connected between the fourth terminal (22) and said common terminal (15) between the first capacitor (C3) and the second capacitor (C4), and comprising a gate controlled half-bridge circuit, made of a fifth switch (S3) and a sixth switch (S4), said fifth switch (S3) being connected between the third terminal (21) and a common terminal (16) between the fifth switch (S3) and the sixth switch (S4) and said sixth switch (S4) being connected between the fourth terminal (22) and the common terminal (16) between the fifth switch (S3) and the sixth switch (S4), the secondary of the transformer (220) being connected between the common terminal (16) between the fifth switch (S3) and the sixth switch (S4) and the common terminal (15) between the first capacitor (C3) and the second capacitor (C4), control means connected to the gates of the input converter switches (S1, S2, S5, S6) and to the gates of the output converter switches (S3, S4) respectively for controlling the switching of the input converter switches in so-called zero-voltage switching mode to convert the DC source voltage to an AC output voltage at a selected frequency at the output of the input converter, and for controlling the switching of the output converter switches in so-called zero-voltage switching mode to convert the AC input voltage at the selected frequency at the input of the output converter to a DC voltage at the output of the output converter, the switching of the input converter and output converter switches being controlled to provide a phase shift between the voltages at the primary and secondary of the transformer, said method comprising a step of varying, in a range up to the value of $\pi$ radians, a first phase shift ($\varphi$HB) between the voltage delivered by said full bridge and the voltage delivered by said half bridge, wherein the operation frequency (f) is simultaneously varied with said first phase shift ($\varphi$HB), so as to minimize the switch losses in the DC/DC converter during operation.

2. The method for controlling a high frequency dual bridge DC/DC power converter according to claim 1, wherein, further, a second phase shift (φFB) is induced between the voltages delivered respectively by the two half bridges or branches constituting the full bridge, modifying thereby the first phase shift (φHB) between the voltage delivered by the full bridge and the voltage delivered by the half bridge.

3. The method for controlling a high frequency dual bridge DC/DC power converter according to claim 1, wherein, further, the operation frequency (f) is decreased towards the LC resonance frequency (f0) of the converter.

4. The method for controlling a high frequency dual bridge DC/DC power converter according to claim 1, wherein the operation frequency (f) is increased up to 4 times the nominal frequency (fN).

5. The method for controlling a high frequency dual bridge DC/DC power converter according to claim 1, wherein the operation frequency (f) is varied so that f0/f<0.75, f0 being the resonance frequency of the converter.

6. The method for controlling a high frequency dual bridge DC/DC power converter according to claim 1, wherein the second phase shift or phase shift within the full bridge (φFB) is up to 165% of π at no-load operation of the converter.

7. The method for controlling a high frequency dual bridge DC/DC power converter according to claim 6, wherein the second phase shift or phase shift within the full bridge (φFB) is ruled by the following algorithm when the first phase shift or phase shift between the half bridge and the full bridge (φHB) overcomes 35%:

If (φHB >0.35) then φFB=1+φHB −0.35; otherwise φFB=1.

8. The method for controlling a high frequency dual bridge DC/DC power converter according to claim 2, wherein, further, the operation frequency (f) is decreased towards the LC resonance frequency (f0) of the converter.

\* \* \* \* \*